United States Patent [19]

Day

[11] 4,428,768
[45] Jan. 31, 1984

[54] PROCESS FOR THE RECOVERY OF PLATINUM GROUP METALS FROM REFRACTORY CERAMIC SUBSTRATES

[75] Inventor: Joseph G. Day, Holmer Green, England

[73] Assignee: Johnson Matthey & Co., Limited, London, England

[21] Appl. No.: 214,267

[22] Filed: Dec. 8, 1980

[30] Foreign Application Priority Data

Dec. 31, 1979 [GB] United Kingdom ................ 7944656

[51] Int. Cl.$^3$ ............................................. C22B 11/02
[52] U.S. Cl. ...................................... 75/10 R; 75/63; 75/83
[58] Field of Search ........................... 75/10 R, 83, 63

[56] References Cited

U.S. PATENT DOCUMENTS

| | | | |
|---|---|---|---|
| 1,841,207 | 1/1932 | Powell et al. | 75/83 |
| 3,021,209 | 2/1962 | Murray et al. | 75/83 |
| 3,304,169 | 2/1967 | Death et al. | 75/83 X |
| 3,783,167 | 1/1974 | Tylko | 13/1 |
| 3,920,789 | 11/1975 | Pittie et al. | 75/121 X |
| 4,135,923 | 1/1979 | Day | 75/83 X |
| 4,188,362 | 2/1980 | Edwards | 75/121 X |
| 4,295,881 | 10/1981 | Saville | 75/10 R |

FOREIGN PATENT DOCUMENTS

| | | | |
|---|---|---|---|
| 328564 | 4/1930 | United Kingdom | 75/83 |
| 1481295 | 7/1977 | United Kingdom | 75/83 |

*Primary Examiner*—M. J. Andrews
*Attorney, Agent, or Firm*—Cushman, Darby & Cushman

[57] ABSTRACT

A process for recovery of platinum group metals (PGMs) from refractory ceramic substrates containing an aluminium silicate and/or alumina, for example, wash-coated auto emission control catalysts and Pt reforming catalysts. A charge, in divided form, containing the substrate, one or fluxes and a collector is heated in a high heat intensity furnace, to a temperature of at least 1420° C. to produce a molten metallic phase including a substantial proportion of the said metals and a molten slag phase. These are then separated and the platinum group metals subsequently extracted from the metallic phase. By choice of suitable fluxes, at least some alumina can be converted to an aluminium silicate which becomes molten at the operating temperature. Further, the ability to use high temperature fluxes avoids the need for an excessive slag which is normally required to dissolve the high alumina content of such catalysts and which normally gives rise to unacceptable losses of the metals to be recovered when applying conventional pyrometallurgical techniques.

17 Claims, No Drawings

PROCESS FOR THE RECOVERY OF PLATINUM GROUP METALS FROM REFRACTORY CERAMIC SUBSTRATES

This invention relates to the recovery of platinum group metals which may be present in artefacts made from refractory materials, that is to say, to the secondary refining of such metals as opposed to primary refining—from the ore.

The high melting point of refractory based substrates which contains platinum group metals (PGM), in particular alumina substrates, presents a severe slag problem when attempts are made using conventional pyrometallurgical processes.

Blast and reverberating furnaces normally operate at temperatures in the range 1250°–1350° C. which is considerably below the melting point of alumina. At these temperatures, therefore, it is necessary to include in the charge, slags such as Wollastonite or Olivine in order to dissolve the alumina but only 15% alumina can be dissolved without detriment to the melting point and viscosity. Many refractory ceramic substrates, however, have an alumina content much higher than 15%. Automobile emission control catalysts with aluminum-silicate (e.g. cordierite and mullite) substrates contain 35% alumina and up to 46% when wash coated. To apply conventional pyrometallurgical process to such catalysts therefore necessitates the use of sufficient flux to maintain an upper limit of 15% $Al_2O_3$ but this is economically non-viable, not least because the loss of PGM in the increased quantities of slag is unacceptable.

What we now propose, in accordance with the present invention, is a process for the recovery of platinum group metals deposited on or contained in a refractory ceramic substrate containing an aluminum silicate and/or alumina, comprising preparing, in divided form, a charge containing the refractory substrate bearing the said metals, one or more fluxes, and a collector material or collector material precursor, for the metal or metals to be recovered, heating the charge to a temperature of at least 1420° C. to produce a molten metallic phase containing a substantial proportion of the said metal or metals, and a molten slag phase containing flux, ceramic residues and the remainder of the said metals, separating the two phases, and separating the platinum group metals from the metallic phase.

The flux or fluxes are preferably selected from the groups consisting of CaO, $CaF_2$, BaO, $Fe_2O_3$, MgO, $SiO_2$ and $TiO_2$.

By heating a charge containing cordierite to at least 1420° (i.e. above the melting point of the cordierite), the amount of slag needed to dissolve the alumina can be reduced. In the case of substrates having an alumina wash coat or which consists of alumina, (e.g. a Pt reforming catalyst) at least some of the alumina, which is a precursor for aluminum-silicate, can be converted to an aluminum-silicate and so can become molten at the operating temperature, by adding to the charge, a $SiO_2$ and/or a MgO, flux. With an alumina substrate acceptable recovery is possible without the addition of $SiO_2$ and/or MgO, but only by including in the charge a flux content approximately equal in weight, to the alumina content.

If the substrate contains another aluminium silicate it may be necessary to operate at a higher temperature. Examples of other aluminum silicates are mullite, sillimanite, petalite, spodumine and andalusite.

In addition, however, the use of operating temperatures higher than heretofore applied in secondary refining, enables the use of the high temperature fluxes specified whereby the alumina present, even where the substrate is wash coated, can be dissolved without excessive quantities of flux.

The melting point of aluminium-silicates such as mullite (aluminum-silicate) or cordierite (magnesium-aluminum silicate) is in the region of 1420° C. but with the addition of an alumina wash-coat the melting point of the substrate is increased to about 1650° C. In order to produce a fluid slag with a low viscosity and hence optimise recovery, the operating temperature needs to be about 100° C. above the melting point of the substrate and we, therefore, prefer operating temperatures in the range 1500°–1750° C. Such temperatures can be achieved using high heat intensity furnaces, for example, submerged electric arc furnaces and plasma-arc furnaces, which latter furnaces are known for primary refining but not for secondary refining.

Because submerged electric arc furnaces produce undesirable agitation of the charge, plasma arc furnaces are to be preferred and we have tested a variety of different types inter alia furnaces incorporating expanded plasma systems, furnaces having a static gun, extended arc furnaces including a transferred plasma arc furnace. Only furnaces adapted for batch operation have been tried but a continuous operation furnace with provision for continuous removal of the slag and/or metallic phases could be used. The process of this invention is operable with all types of high heat intensity furnaces tested though with varying degrees of success. It is considered, however, that the difference in recovery obtained were related primarily to the charge formulation and only to a limited extent upon the type of furnace used.

Suitable gases for the plasma are argon, helium, or nitrogen and we have found that it is even possible under some circumstances to use air, which is considerably cheaper than the alternatives. With air, however, there is a tendency to oxidise iron with attendant loss of iron into the slag.

The divided charge is fed gradually into the furnace through the plasma arc and, in batch processes, it is desirable to continue the discharge of the plasma arc for a minimum holding period after passing the entire charge therethrough, the minimum holding period preferably being from 5 to 30 mins.

Automobile emission control catalysts may be in one of two basic forms namely a monolithic structure or in pelletized form. The charge is prepared by mixing in suitable proportions the catalyst material reduced to a finely divided form by crushing or otherwise or, depending upon the pellet size, in the form of pellets, with the flux or fluxes and collector material or materials. If desired a monolith catalyst or large pellets may be reduced by (e.g.) crushing and mixed with the selected flux(es) and collector material(s), the mixture then being compacted to produce pellets. A binder material preferably in an amount of 2% by wt of the mixture, can be used to ensure adequate green strength.

The grain size of the charge is selected inter alia to ensure intimate contact between the catalyst material, the fluxes and the collector and to avoid undue losses by entrainment in the gas flow through the plasma furnace.

It is preferred to reduce the catalyst to the range minus 10-minus 200 mesh but in trials we have conducted, the best results have been obtained at minus 8 mesh (2.8 mm).

Satisfactory results have, however, been obtained using raw autocat pellets measuring 3 mm×6 mm and pellets compacted from a finely divided mixture of the refractory substrate, flux and collector, having a diameter of ⅜".

As for the collector material, this is preferably present in an amount of 2–10% by weight (of the refractory material) and in the preferred embodiment, iron is used either in the form of iron powder or filings or cast iron shavings. Alternatively, the iron can be produced in situ by the addition of an oxide of iron, such as hematite and a reducing agent such as carbon, to the charge. Other collector materials may be used, e.g., copper, nickel, cobalt, lead, aluminum or mixtures thereof.

The choice of flux or fluxes, which may be present in an amount of up to 100% by weight (of the refractory material content), depends to a large extent upon the particular refractory material from which the PGM's are to be recovered. As stated above MgO and/or $SiO_2$ are useful to convert alumina to aluminium silicate (e.g. cordierite). We have found that CaO is particularly efficient in producing good recovery and is a preferred component of the flux. Another preferred flux component is $CaF_2$ which has a high solubility in the refractory oxide, alumina.

The operating temperature of the plasma should be kept to the minimum consistent with the production of a low viscosity slag and satisfactory recovery of platinum group metal. Both $Fe_2O_3$ and CaO are beneficial in lowering the melting point and viscosity of the slag.

Separation of the slag and metallic phases, and separation of the platinum group metals from the metallic phase, after cooling thereof, may be effected by any suitable method known to those skilled in the art.

EXAMPLES 1 TO 10

Preparation of Charge

Automobile emission control catalysts hereinafter referred to as "autocat" consisting of Pt, Rh, and NiO deposited upon an $Al_2O_3$ washcoated cordierite ceramic refractory were jaw crushed to minus 8 mesh (2.8 mm). An analysis of the "as received material and the crushed catalyst" showed very good agreement, which suggests that any fines that were lost during the crushing operation did not contain a significantly higher proportion of platinum group metals. Samples of the crushed catalyst from three of the trials were analysed, the results were as follows:

|  | % by weight | | |
| --- | --- | --- | --- |
|  | Pt | Rh | Ni |
| Trial 6 | 0.21 | 0.026 | 0.67 |
| Trial 9 | 0.21 | 0.025 | 0.55 |
| Trial 10 | 0.19 | 0.023 | 0.58 |

The relevant fluxes were added as powders from standard laboratory reagents, the lime was added as $Ca(OH)_2$. The iron collector was added as iron sponge or as gray cast iron shavings with a particle size similar to the crushed catalyst. The whole charge was hand-mixed and fed into a hopper.

Plasma

Because of the small scale of the operation a static plasma arc furnace was used and melting was carried out either in salamander, suprex or graphite crucibles.

In the initial trial the charge from the hopper was screw fed into the crucible via three plastic tubes. The tubes were kept cool by the passage of argon. In order to maintain the plasma a flow of argon is passed through the water cooled plasma gun. With this relatively high gas velocity, it is possible that any fines in the charge might be blown through the system. In order to minimise such losses all subsequent trials used a single feed tube, thus reducing the argon throughput.

A known weight of charge was put into the hopper for each trial. A total of ten trials detailed in the following examples were carried out nine with a nominal charge of 5 kg catalyst with the last trial at the 10 kg scale. The feed rate to the plasma was 0.5 kg $min^{-1}$ in all the trials. When all the charge had melted, a fluid melt was maintained for a minimum holding time. After the requisite holding period the power was switched off, the refractory insulating box removed and the crucible and contents withdrawn. The products were physically removed from the crucible in each trial. The slag was broken into pieces with a hammer and any visible metal prills removed. The balance of the slag was crushed and split riffled to give an assay sample. The brittle metallic collector button was broken and tema milled to produce a representative sample for assay. The platinum group metal recoveries were calculated on the weights and assays of the melted products.

No attempts were made to collect the fume from the trials, and the exit gases were allowed to burn and escape to the atmosphere. The exact loss due to fume was not established; however, a sample of the fume that had condensed in the exhaust tube over several runs and could not, therefore, be associated with any particular trial was analysed. The results showed that it contained 0.05% Pt and 0.008% Rh.

The results achieved in the Examples 1 to 10 are set out in Table 1. It will be seen that direct melting of the autocat at 1700° C. with 5% Fe gave poor coalesence of the collector and resulted in numerous prills in the slag. The addition of 30% MgO+$SiO_2$ to convert the $Al_2O_3$ washcoat to cordierite reduced the operating temperature to 1550° C. and gave recoveries of 93.8% Pt and 98.9% Rh.

Of the fluxes used CaO gave the least amount of fume, an operating temperature similar to cordierite, and good coalescence of the collector with recoveries of 94.3% Pt and 98.5% Rh.

TABLE 1

| Ex | Charge Flux | Wt % Flux Added | Collector | Temp °C. | Holding Time (Min) | Visual Examination | % Recovery Pt | Rh | Remarks |
| --- | --- | --- | --- | --- | --- | --- | --- | --- | --- |
| 1 | 5 kg Autocat crushed to minus 8 mesh (2.8 mm) | — | 5% cast iron shavings | 1700 | 15 | Poor separation, large no. prills | — | — | Graphite crucible |
| 2 | As Ex. 1 + MgO. $SiO_2$ to convert | 30 | 5% Fe powder | 1540 | None | Numerous prills | — | — | |

TABLE 1-continued

| Ex | Charge Flux | Wt % Flux Added | Collector | *Temp °C. | Holding Time (Min) | Visual Examination | % Recovery Pt | % Recovery Rh | Remarks |
|---|---|---|---|---|---|---|---|---|---|
| | Al$_2$O$_3$ washcoat to cordierite | | | | | | | | |
| 3 | As Ex. 2 | 30 | 5% Fe powder | 1540 | 15 | Good separation, minimal prills | 93.8 | 98.9 | |
| 4 | As Ex. 2 | 30 | 2% cast iron shavings | 1550 | 30 | Good separation minimal prills | 91.7 | 98 | Effect of reducing iron collector to 2% and increasing holding period |
| 5 | As Ex. 2 | 30 | 5% cast iron shavings | Variable | 30 | Several large prills, poor coalescence | — | — | Several operational problems |
| 6 | As Ex. 2 + CaO | 30% MgOSiO$_2$ 10% CaO | 5% Cast iron shavings | 1470 | 15 | Clean separation almost complete coalescence | 83.9 | 94.5 | Poor mass balance (probably due to lock-up/contamination in charge mechanism) |
| 7 | As Ex. 1 + Fe$_2$O$_3$ + Fe powder | 10 3.3 | 5% cast iron shavings | 1560 | 15 | Fair separation, large amount of iron collector present | — | — | Large amount of fume, All Fe$_2$O$_3$ added appears to have been reduced by Fe to FeO |
| 8 | As Ex. 1 + CaO | 10 | 5% cast iron shavings | 1550 | 15 | Good separation | (a)94.3 (b)96.1 | 8.5 | Slag treated on low intensity magnetic separator |
| 9 | As Ex. 1 + CaF$_2$ | 10 | 5% cast iron shavings | 1550 | 15 | Good separation | 91.9 | 98.1 | Lot of fume evolved |
| 10 | As Ex. 1 + CaO (10 kg charge) | 10 | 2% cast iron | 1550 | 15 | Good separation | 86.8 | 96.3 | Crucible leaked near end of trial resulting in some loss of slag. |

*Optical pyrometer

The slag from Example 8 (autoemission control catalyst +10% CaO flux) was ground to 80% minus 100 mesh, mixed with water to form a slurry containing 15% solids and passed through a low intensity (1200 gauss) wet drum magnetic separator. A magnetic concentrate totalling 2% of the input material was obtained. The assays of the products were as follows:

| | Pt % | Rh % | Fe |
|---|---|---|---|
| Input slag | 0.01 | 0.0003 | |
| Magnetic concentrate | 0.187 | | 6.58 |
| Discard slag | 0.0085 | — | 0.37 |
| Recalculated head | 0.012 | | |

The platinum recovery from the slag after magnetic scavenging was 31%.

Changes in rhodium concentrate at these low levels was not taken into account. The overall platinum recovery from the catalyst after magnetic scavenging was increased from 94.3% to 96.1%. Because of the low concentration of platinum group metals in the magnetic concentrate, it would probably be returned with the feed to the plasma furnace.

EXAMPLES 11 TO 15

A summary of these examples, which were conducted using the same furnace as for Examples 1 to 10 but with a Pt/Pd containing monolith autocat, is set out in Table 2.

As before the monolith autocat was ground or crushed to minus 8 mesh but the autocat and Pt reforming catalyst pellets were mixed with the appropriate fluxes and iron collector, as received. The CaO was added as lime (Ca(OH)$_2$) and CaF$_2$ and MgO were commercially available powders.

The recovery of platinum in Examples 11 to 14 was very similar to platinum recovery in Examples 1 to 10. The recovery of palladium on the other hand is slightly lower than the recovery of rhodium (i.e. 96.6% as compared with 98.5%).

Recoveries of 95.3% Pt and 96.6% Pd were obtained when cordierite based autocatalyst monoliths were smelted at approximately 1500° C. in a static expanded plasma arc furnace with 10% CaO flux additions and an iron collector. Increasing the weight of Iron in the charge from 5% to 10% reduced the residual PGMs in the slag from 0.013% to 0.007%. The dust collected accounted for 1.8% of the charge and represented 0.7% of the platinum and 1.5% of the palladium in the input material.

In order to achieve a comparable smelting temperature with pure alumina substrates the amount of fluxes required constitutes 50% of the charge. Although the level of PGMs in the Al$_2$O$_3$—CaO—MgO—CaF$_2$ slag were of the same order (0.009%) as the monolith trials, the increase in weight of the fluxes resulted in a PGM recovery of only 60% with 4 wt% iron collector. Increasing the latter to 10% and recirculating the Fe-PGM, in order to achieve a reasonable concentration of PGMs in the bullion, should improve the recovery. The results of the initial smelting trials with platinum reforming catalyst using a CaO—MgO flux addition and 2.5% iron collector showed a recovery of 95% Pt and produced a bullion containing 16.78% Pt.

TABLE 2

| Ex | Charge | Flux (wt %) | Collector | Feed Rate kg/min | Temp °C. | Holding Time (Min) | Visual Examination | % Recovery Pt | % Recovery Rh | % Recovery Pd | Remarks |
|---|---|---|---|---|---|---|---|---|---|---|---|
| 11 | 5 kg Autocat | 10 | 5% cast | 1 | 1500 | 15 | Good coalescence, | — | — | — | Suprex crucible |

TABLE 2-continued

| Ex | Charge | Flux (wt %) | Collector | Feed Rate kg/min | Temp °C. | Holding Time (Min) | Visual Examination | % Recovery Pt | Rh | Pd | Remarks |
|---|---|---|---|---|---|---|---|---|---|---|---|
| | crushed to minus 8 mesh + CaO | | iron turnings | | | | separation from slag easy | | | | |
| 12 | As Ex. 11 | 10 | 10% Fe | 1 | 1510 | 15 | Good coalescence, separation from slag easy | 95.3 | | 96.6 | Collector Fe-PGM from Ex. 11 + 5% virgin Fe. Superstar crucible |
| 13 | 4.9 kg autocatalyst Alumina pellets (3 mm × 6 mm) + CaO | 100 | 2.5 cast iron turnings | 1 | 1420 | 15 | large prills trapped in slag. poor coalescence | — | — | — | Salamander crucible Probably slag too viscous = 25% loss in wt of collector |
| 14 | 2.5 kg autocatalyst pellets 1.5 kg CaO 0.5 kg MgO 0.5 kg CaF$_2$ | 100 | 5% Fe | 0.7 | 1475 | 15 | a number of prills in base of slag | 60 | | 62 | Salamander crucible |
| 15 | 5.0 kg Pt reforming catalyst 1.7 mm dia pellets 3.9 kg CaO 1.0 mgO | 100 | 2.5% cast iron turnings | 0.5 | 1500 | 15 | good coalescence only two large prills | 95 | — | — | Suprex crucible |

EXAMPLES 16 TO 20 monolith, flux and collector. The result is set out at the foot of Table 3.

TABLE 3

| Ex | Charge | Flux (wt %) | Collector | Feed Rate kg/min | Temp °C. | Holding Time (Min) | Visual Examination | % Recovery Pt | Rh | Pd | Remarks |
|---|---|---|---|---|---|---|---|---|---|---|---|
| 16 | 1 kg Autocatalyst + CaO | 10 | 10% iron powder | | 1600 | 15 | good coalescence but a number of prills | | | | |
| 17 | 500 g Autocatalyst pellets 250 g CaO 250 g SiO$_2$ | 100 | 10% | | 1550 | 5 | good coalescence fewer prills than in Ex. 16 | 76 | | 53 | Considerable loss of collector and gain in weight of slag |
| 18 | 500 g Autocatalyst pellets 300 g CaO 100 g CaF 100 g MgO | 100 | 10% iron shot | | 1600 | 5 | | 74 | | 70 | As Ex. 17 |
| 19 | 1.0 kg monolith quotocatalyst 100 g CaO | 10 | 20% iron shot | | 1550 | 8 | good coalescence few prills | 65 | | 62.5 | |
| 20 | 500 g Autocatalyst pellets 400 g CaO 100 g MgO | 100 | 10% iron shot | | 1550 | 8 | | 53 | | 35 | |
| 21 | Pellitised Charge autocat monolith 13.67 kg +CaO+ 2% binder | 10 | 10% Fe | 1 | | 15 | | 97 | | 97 | |

These Examples relate to trials conducted in an extended arc furnace supplied by University of Toronto, Canada, using Pt/Pd containing refractory substrates, the substrate in each case being ground to minus 60 mesh.

The best recoveries of 74% Pt and 70% Pd were achieved with only 2.6% Fe collector and a slag composition similar to that used in the expanded plasma arc furnace. The residual PGM content of the slag was 0.006. Full results are set out in Table 3.

EXAMPLE 21

This example relates to a trial conducted in a furnace supplied by Technology Application Services Corporation, of North Carolina, U.S.A. The trial was conducted using a pellitised charge including a crushed cordierite

I claim:

1. A process for the recovery of platinum group metals present in a used auto emission control catalyst comprising a refractory ceramic substrate having the platinum group metal deposited on or contained in the refractory ceramic substrate, the said substrate containing an aluminum-silicate and/or alumina, said process comprising preparing, in divided form, a charge containing the refractory ceramic substrate bearing the said metals, one or more fluxes, and a collector material or collector material precursor, for the metal or metals to be recovered, feeding said charge into a high intensity plasma arc furnace and heating the charge to a temperature in the range 1500°–1750° C. by means of the high intensity plasma arc of said furnace to produce a molten metallic phase containing a substantial proportion of the said metal or metals formerly deposited on or contained in the substrate, and a molten slag phase containing flux, ceramic residues and the remainder of the said metals, separating the two phases, and separating the platinum group metals from the metallic phase, the collector material comprising iron powder or filings, iron sponge or cast iron shavings.

2. A process according to claim 1, wherein the flux or fluxes are selected from the group consisting of CaO, $CaF_2$, BaO, $Fe_2O_3$, MgO, $SiO_2$ and $TiO_2$.

3. A process according to claim 1 wherein the gas for the plasma arc is selected from the group consisting of Argon, Helium, Nitrogen and Air.

4. A process according to claim 2 wherein the flux content of the charge is up to 100% by wt of the refractory ceramic substrate content of the charge.

5. A process according to claim 4 wherein the flux content of the charge is 10% by wt of the refractory ceramic substrate content of the charge.

6. A process according to claim 1 wherein the collector material content of the charge is 2 to 10% of the refractory substrate content of the charge.

7. A process according to claim 1 wherein the refractory ceramic substrate is reduced to finely divided form by crushing or the like.

8. A process according to claim 7 wherein the finely divided substrate has a mesh size in the range minus 10 to minus 200 mesh.

9. A process according to claim 7 wherein the substrate in finely divided form is mixed with the flux or fluxes and collector material, and the charge so produced is compacted to form charge pellets.

10. A process according to claim 9 wherein 2% by wt of a binder material is added to the finely divided charge.

11. A process according to claim 1 wherein the substrate is an alumina wash-coated aluminum silicate.

12. A process according to claim 11 wherein the flux comprises MgO and/or $SiO_2$ whereby during heating at least some of the alumina wash-coat is converted to an aluminum silicate.

13. A process according to claim 12 wherein the aluminmum silicate is cordierite.

14. A process according to claim 1 wherein the substrate consists of alumina and the flux content of the charge is approximately equal in weight to the alumina content.

15. A process according to claim 1 and which is a batch process, wherein the divided charge is fed into the furnace through the plasma arc and wherein discharge of the plasma arc is continued for a minimum holding period after passing the entire charge therethrough.

16. A process according to claim 1 in which the collector material precursor is an oxide of iron and a reducing agent.

17. A process according to claim 16 in which the oxide of iron is hematite and the reducing agent is carbon.

* * * * *

REEXAMINATION CERTIFICATE (792nd)

United States Patent [19]

Day

[11] B1 4,428,768

[45] Certificate Issued Dec. 8, 1987

[54] PROCESS FOR THE RECOVERY OF PLATINUM GROUP METALS FROM REFRACTORY CERAMIC SUBSTRATES

[75] Inventor: Joseph G. Day, Holmer Green, England

[73] Assignee: Johnson Matthey & Co., Limited, London, England

Reexamination Request:
No. 90/000,775, May 3, 1985

Reexamination Certificate for:
Patent No.: 4,428,768
Issued: Jan. 31, 1984
Appl. No.: 214,267
Filed: Dec. 8, 1980

[30] Foreign Application Priority Data

Dec. 31, 1979 [GB] United Kingdom ............... 7944656

[51] Int. Cl.$^4$ .................... C22B 4/00; C22B 11/02
[52] U.S. Cl. ......................................... 75/10.19; 75/63; 75/83
[58] Field of Search ............... 75/10 R, 83, 63, 10.19

[56] References Cited

U.S. PATENT DOCUMENTS

| Re. 28,570 | 10/1975 | Tylko | 373/23 |
| 3,021,209 | 2/1962 | Murray et al. | 75/83 |
| 3,565,830 | 2/1971 | Keith et al. | 502/242 |
| 4,157,316 | 6/1979 | Thompson et al. | 502/304 |
| 4,295,881 | 10/1981 | Saville | 75/10 R |

FOREIGN PATENT DOCUMENTS

| 7802907 | 9/1979 | South Africa . |
| 2067599 | 7/1981 | United Kingdom . |

*Primary Examiner*—M. J. Andrews

[57] ABSTRACT

A process for recovery of platinum group metals (PGMs) from refractory ceramic substrates containing an aluminium silicate and/or alumina, for example, wash-coated auto emission control catalysts and Pt reforming catalysts. A charge, in divided form, containing the substrate, one or fluxes and a collector is heated in a high heat intensity furnace, to a temperature of at least 1420° C. to produce a molten metallic phase including a substantial proportion of the said metals and a molten slag phase. These are then separated and the platinum group metals subsequently extracted from the metallic phase. By choice of suitable fluxes, at least some alumina can be converted to an aluminium silicate which becomes molten at the operating temperature. Further, the ability to use high temperature fluxes avoids the need for an excessive slag which is normally required to dissolve the high alumina content of such catalysts and which normally gives rise to unacceptable losses of the metals to be recovered when applying conventional pyrometallurgical techniques.

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Columns 7 and 8, lines 26–52:

TABLE 3

| Ex | Charge | Flux (wt %) | Collector | Feed Rate kg/min | Temp °C. | Holding Time (Min) | Visual Examination | % Recovery Pt | Rh | Pd | Remarks |
|---|---|---|---|---|---|---|---|---|---|---|---|
| 16 | 1 kg Autocatalyst + CaO | 10 | 10% iron powder | | [1600] | 15 | good coalescence but a number of prills | | | | |
| 17 | 500 g Autocatalyst pellets 250 g CaO 250 SiO$_2$ | 100 | 10% | | [1550] | 5 | good coalescence fewer prills than in Ex. 16 | 76 | | 53 | Considerable loss of collector and gain in weight of slag |
| 18 | 500 g Autocatalyst pellets 300 g CaO 100 g CaF 100 g MgO | 100 | 10% iron shot | | [1600] | 5 | | 74 | | 70 | As Ex. 17 |
| 19 | 1.0 kg monolith quotocatalyst 100 g CaO | 10 | 20% iron shot | | [1550] | 8 | good coalescence few prills | 65 | | 62.5 | |
| 20 | 500 g Autocatalyst pellets 400 g CaO 100 g MgO | 100 | 10% iron shot | | [1550] | 8 | | 53 | | 35 | |
| 21 | Pellitised Charge autocat monolith 13.67 kg + CaO + 2% binder | 10 | 10% Fe | 1 | | 15 | | 97 | | 97 | |

AS A RESULT OF REEXAMINATION, IT HAS BEEN DETERMINED THAT:

Claim 11 is cancelled.

Claims 1, 7 and 12 are determined to be patentable as amended.

Claims 2–6, 8–10 and 13–17, dependent on an amended claim, are determined to be patentable.

New claims 18–20 are added and determined to be patentable.

1. A *secondary refining* process *employing a plasma arc furnace* for the recovery of platinum group metals present in [used] *a charge containing* auto emission control catalyst comprising a refractory ceramic substrate having the platinum group metal deposited on or contained in the refractory ceramic substrate, the said substrate containing an aluminum-silicate [and/or] *and carrying an* alumina *washcoat*, said process comprising preparing the whole of the charge by mixing together;

(a) particulate refractory ceramic substrate bearing the washcoat and the said metals,
(b) one or more particulate fluxes,
(c) particulate iron collector material for the metal or metals to be recovered or particulate iron collector material precursor and

[in divided form, a charge containing the refractory ceramic substrate bearing the said metal, one or more fluxes, and a collector material or collector material precursor, for the metal or metals to be recovered, feeding said] (d) *any optional components of the charge, then feeding the* charge into a high intensity plasma arc furnace and heating the charge to a temperature in the range 1500°–1750° C. by means of the high intensity plasma arc of said furnace to produce a molten metallic phase containing a substantial proportion of the said metal or metals formerly deposited on or contained in the substrate, and a molten slag phase containing flux, ceramic residues and the remainder of the said metals, separating the two phases, and separating the platinum group metals from the metallic phase [the collector material comprising iron powder or filings, iron sponge or cast iron shavings].

7. A process according to claim 1 wherein the refractory ceramic substrate is *a monolith* reduced to finely divided form by crushing or the like.

12. A process according to claim [11] *1* wherein the flux comprises MgO and/or SiO$_2$ whereby during heating at least some of the alumina wash-coat is converted to an aluminum silicate.

*18. A process according to claim 1 wherein the charge is fed into the plasma arc furnace through the plasma arc and the alumina washcoat is dissolved in the slag and at least 91.7% of the platinum metal in the charge is recovered.*

*19. A secondary refining process employing a plasma arc furnace for the recovery of the platinum group metals present in a particulate charge containing auto emission* ontrol catalyst comprising a refractory ceramic substrate having the platinum group metal deposited on or contained in the refractory ceramic substrate, the said substrate containing an aluminum silicate and carrying an alumina washcoat, said process comprising the steps of:

i. providing magnesium moieties to the charge by adding magnesium oxide and/or selecting a substrate which contains a magnesium aluminum silicate;

ii. preparing the whole of the particulate charge by mixing together:
   a. particulate refractory ceramic substrate bearing the washcoat and the said metals,
   b. one or more particulate fluxes,
   c. particulate iron collector material for the metal or metals to be recovered or particulate from collector material precursor, and
   d. any optional components of the charge, iii. feeding the particulate charge into a high intensity plasma arc furnace and heating the charge to a temperature in the range $1500°-1750°$ C. by means of the high intensity plasma arc of said furnace to produce a molten metallic phase containing a substantial proportion of the said metal or metals formerly deposited on or contained in the substrate, and a molten slag phase containing flux, ceramic residues and the remainder of the said metals;

iv. separating the metal phase from the slag phase; and v. separating the platinum group metals from the metallic phase so as to obtain at least 91.7% recovery of the platinum metal.

20. A process according to claim 19 wherein auto emission control catalyst is selected from the group consisting of monolithic auto emission control catalysts and the catalyst is crushed to produce particles capable of passing through a 2.8 mm mesh sieve.

* * * * *